US011803320B2

(12) United States Patent
Yasuda

(10) Patent No.: US 11,803,320 B2
(45) Date of Patent: Oct. 31, 2023

(54) MEMORY SYSTEM AND CONTROL METHOD

(71) Applicant: Kioxia Corporation, Tokyo (JP)

(72) Inventor: Tetsuya Yasuda, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 133 days.

(21) Appl. No.: 17/547,590

(22) Filed: Dec. 10, 2021

(65) Prior Publication Data

US 2023/0087002 A1 Mar. 23, 2023

(30) Foreign Application Priority Data

Sep. 17, 2021 (JP) ................. 2021-152564

(51) Int. Cl.
*G06F 12/00* (2006.01)
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0246* (2013.01); *G06F 2212/7211* (2013.01)

(58) Field of Classification Search
CPC .... G06F 3/0604; G06F 3/0679; G06F 3/0616; G06F 12/0246; G06F 2212/7211
See application file for complete search history.

(56) References Cited

U.S. PATENT DOCUMENTS

| 9,710,176 | B1* | 7/2017 | Tang ................... G06F 12/0246 |
| 10,417,123 | B1 | 9/2019 | Souri et al. |
| 2011/0078402 | A1* | 3/2011 | Sato ..................... G11C 16/349 |
| | | | 711/E12.001 |
| 2014/0181434 | A1 | 6/2014 | Chau et al. |
| 2015/0143068 | A1* | 5/2015 | Higgins .............. G06F 12/0246 |
| | | | 711/166 |
| 2017/0010818 | A1* | 1/2017 | Kitsunai ............... G06F 3/0652 |
| 2019/0205245 | A1 | 7/2019 | Gao et al. |
| 2019/0347192 | A1* | 11/2019 | Hsiao .................... G06F 3/0679 |

* cited by examiner

*Primary Examiner* — John A Lane
(74) *Attorney, Agent, or Firm* — Foley & Lardner LLP

(57) ABSTRACT

A controller of a memory system according to an embodiment manages, for each of a plurality of blocks, first information indicating whether a corresponding block is in use which indicates a state where the data is stored, second information indicating the number of erasures, and third information indicating a waiting time until next erasure. The controller executes first sequential write received from a host, and determines whether to execute processing of leveling the number of erasures for each of the plurality of blocks based on a first difference, a second difference, and a third difference when executing second sequential write received from the host.

14 Claims, 14 Drawing Sheets

| BLOCK NUMBER | VACANT | NUMBER OF ERASURES | ERASING ORDER |
|---|---|---|---|
| 0 | IN USE | 1 | 0 |
| 1 | VACANT | 17 | 54 |
| 2 | VACANT | 17 | 55 |
| 3 | IN USE | 17 | 56 |
| 4 | IN USE | 1 | 5 |
| 5 | IN USE | 1 | 6 |
| 6 | IN USE | 1 | 7 |
| 7 | IN USE | 1 | 8 |

FIG.6C

| BLOCK NUMBER | VACANT | NUMBER OF ERASURES |
|---|---|---|
| 0 [6] | × | 9 |
| 1 [//] | × | 9 |
| 2 | ○ | 16 |
| 3 [1] | × | 16 |
| 4 [2] | × | 16 |
| 5 [3] | × | 16 |
| 6 [4] | × | 16 |
| 7 [5] | × | 16 |

▨ STATIC DATA

▦ DYNAMIC DATA WRITE ORDER

FIG.6D

| BLOCK NUMBER | VACANT | NUMBER OF ERASURES |
|---|---|---|
| 0 [6] | × | 9 |
| 1 | ○ | 9 |
| 2 [//] | × | 17 |
| 3 [1] | × | 16 |
| 4 [2] | × | 16 |
| 5 [3] | × | 16 |
| 6 [4] | × | 16 |
| 7 [5] | × | 16 |

▨ STATIC DATA

▦ DYNAMIC DATA WRITE ORDER

FIG.6E

| BLOCK NUMBER | VACANT | NUMBER OF ERASURES |
|---|---|---|
| 0 [5] | × | 9 |
| 1 [6] | × | 10 |
| 2 [▨] | × | 17 |
| 3 | ○ | 16 |
| 4 [1] | × | 16 |
| 5 [2] | × | 16 |
| 6 [3] | × | 16 |
| 7 [4] | × | 16 |

DYNAMIC DATA BECOMES CANDIDATE FOR DATA TO BE MOVED

▨ STATIC DATA

▦ DYNAMIC DATA WRITE ORDER

FIG.6F

| BLOCK NUMBER | VACANT | NUMBER OF ERASURES |
|---|---|---|
| 0 | ○ | 9 |
| 1 [6] | × | 10 |
| 2 [▨] | × | 17 |
| 3 [5] | × | 17 |
| 4 [1] | × | 16 |
| 5 [2] | × | 16 |
| 6 [3] | × | 16 |
| 7 [4] | × | 16 |

▨ STATIC DATA

▦ DYNAMIC DATA WRITE ORDER

FIG.6G

| BLOCK NUMBER | | VACANT | NUMBER OF ERASURES |
|---|---|---|---|
| 0 | 2 | × | 17 |
| 1 | 1 | × | 17 |
| 2 | ▨ | × | 17 |
| 3 |   | ○ | 24 |
| 4 | 3 | × | 24 |
| 5 | 4 | × | 24 |
| 6 | 5 | × | 24 |
| 7 | 6 | × | 24 |

▨ STATIC DATA
☐ DYNAMIC DATA WRITE ORDER

FIG.6H

| BLOCK NUMBER | | VACANT | NUMBER OF ERASURES |
|---|---|---|---|
| 0 | 2 | × | 17 |
| 1 | 1 | × | 17 |
| 2 |   | ○ | 17 |
| 3 | ▨ | × | 25 |
| 4 | 3 | × | 24 |
| 5 | 4 | × | 24 |
| 6 | 5 | × | 24 |
| 7 | 6 | × | 24 |

▨ STATIC DATA
☐ DYNAMIC DATA WRITE ORDER

FIG.7A

SWL ACTIVATION CONDITION IS THAT DIFFERENCE IN NUMBER OF ERASURES IS EQUAL TO OR LARGER THAN 7 AND DIFFERENCE IN ERASING ORDER IS EQUAL TO OR GREATER THAN 56

| BLOCK NUMBER | IN USE OR VACANT | NUMBER OF ERASURES | ERASING ORDER |
|---|---|---|---|
| 0 | IN USE | 1 | 0 |
| 1 | VACANT | 9 | 57 |
| 2 | VACANT | 9 | 58 |
| 3 | IN USE | 9 | 59 |
| 4 | IN USE | 9 | 60 |
| 5 | IN USE | 9 | 61 |
| 6 | IN USE | 9 | 62 |
| 7 | IN USE | 9 | 63 |

SWL MOVES STATIC DATA

⇧

| BLOCK NUMBER | IN USE OR VACANT | NUMBER OF ERASURES | ERASING ORDER |
|---|---|---|---|
| 0 | VACANT | 1 | 0 |
| 1 | IN USE | 10 | 64 |
| 2 | VACANT | 9 | 58 |
| 3 | IN USE | 9 | 59 |
| 4 | IN USE | 9 | 60 |
| 5 | IN USE | 9 | 61 |
| 6 | IN USE | 9 | 62 |
| 7 | IN USE | 9 | 63 |

HOST WRITES DYNAMIC DATA

⇧

| BLOCK NUMBER | IN USE OR VACANT | NUMBER OF ERASURES | ERASING ORDER |
|---|---|---|---|
| 0 | IN USE | 2 | 65 |
| 1 | IN USE | 10 | 64 |
| 2 | VACANT | 9 | 58 |
| 3 | VACANT | 9 | 59 |
| 4 | IN USE | 9 | 60 |
| 5 | IN USE | 9 | 61 |
| 6 | IN USE | 9 | 62 |
| 7 | IN USE | 9 | 63 |

FIG.7B

SWL ACTIVATION CONDITION IS THAT DIFFERENCE IN NUMBER OF ERASURES IS EQUAL TO OR LARGER THAN 7 AND DIFFERENCE IN ERASING ORDER IS EQUAL TO OR GREATER THAN 56

| BLOCK NUMBER | IN USE OR VACANT | NUMBER OF ERASURES | ERASING ORDER |
|---|---|---|---|
| 0 | IN USE | 1 | 0 |
| 1 | VACANT | 17 | 54 |
| 2 | VACANT | 17 | 55 |
| 3 | IN USE | 17 | 56 |
| 4 | IN USE | 1 | 5 |
| 5 | IN USE | 1 | 6 |
| 6 | IN USE | 1 | 7 |
| 7 | IN USE | 1 | 8 |

DIFFERENCE IN NUMBER OF ERASURES IS TOO LARGE

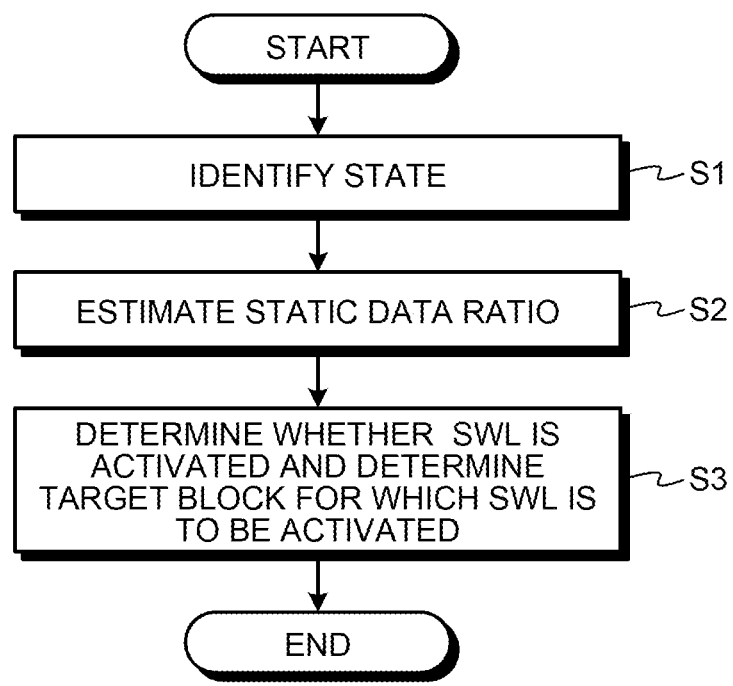

MEMORY SYSTEM AND CONTROL METHOD

CROSS-REFERENCE TO RELATED APPLICATIONS

This application is based upon and claims the benefit of priority from Japanese Patent Application No. 2021-152564, filed on Sep. 17, 2021; the entire contents of which are incorporated herein by reference.

FIELD

Embodiments described herein relate generally to a memory system and a control method.

BACKGROUND

In related art, a memory system such as a solid state drive (SSD) including a nonvolatile memory is known. As an example of the nonvolatile memory included in the SSD, a NAND flash memory (hereinafter, referred to as a NAND memory) is known. The NAND memory includes a memory cell array in which NAND circuits are arranged in a lattice pattern. The memory cell array is divided into a plurality of blocks, each of the blocks being a unit of data erasure. The SSD executes erasure for a target block to write data to the target block of the NAND memory. Thereafter, the SSD writes data to the block for which erasure is executed. In addition, the NAND memory has a limitation in the number of erasures that can be executed for a block to avoid deterioration of characteristics.

By the way, in such a memory system, in order to prevent variations in life of each block of the NAND memory, processing of leveling the number of erasures (or the number of writes) for each block is executed. This processing is also referred to as wear leveling. As a wear leveling method, there is known static wear leveling (SWL) to be performed on both a block in which static data having a low rewrite frequency is written and a block in which dynamic data having a high rewrite frequency is written.

BRIEF DESCRIPTION OF THE DRAWINGS

FIG. 6C is a diagram illustrating another part of another execution example of SWL according to the first comparative example;

FIG. 6D is a diagram illustrating another part of another execution example of SWL according to the first comparative example;

FIG. 6E is a diagram illustrating another part of another execution example of SWL according to the first comparative example;

FIG. 6F is a diagram illustrating another part of another execution example of SWL according to the first comparative example;

FIG. 6G is a diagram illustrating another part of another execution example of SWL according to the first comparative example;

FIG. 6H is a diagram illustrating another part of another execution example of SWL according to the first comparative example;

FIG. 7A is a diagram illustrating an execution example of SWL according to a second comparative example;

FIG. 7B is a diagram illustrating another execution example of SWL according to the second comparative example;

FIG. 11 is a flowchart illustrating flow of processing of SWL according to the embodiment.

DETAILED DESCRIPTION

A memory system according to an embodiment includes a nonvolatile memory including a plurality of blocks, each of the blocks being a unit of erasure, and a controller connected to the nonvolatile memory and connectable to a host. The controller is configured to: manage, for each of the plurality of blocks, first information indicating whether a corresponding block is in use which indicates a state where the data is stored, second information indicating a number of erasures, and third information indicating a waiting time until next erasure; receive a request for first sequential write from the host; execute the first sequential write in the received request; and receive a request for second sequential write from the host after the first sequential write. The controller is configured to determine whether to execute processing of leveling the number of erasures for each of the plurality of blocks with respect to a first block for which the first information indicates that data is in use, based on a first difference, a second difference, and a third difference when executing the second sequential write in the received request. The first difference is a difference in the waiting time of the first block before and after data write which is to be executed next on the first block. The second difference corresponds to a difference between a first maximum value of erasing order in the first sequential write and a second maximum value of erasing order in the second sequential write for a plurality of blocks which become write targets of the second sequential write. The third difference is a difference between a number of erasures for the first block and a number of erasures for a second block for which the first information does not indicate that data is in use.

A memory system and a control method according to an embodiment will be described in detail below with reference to the accompanying drawings. Note that the present invention is not limited to this embodiment.

Figure 1:
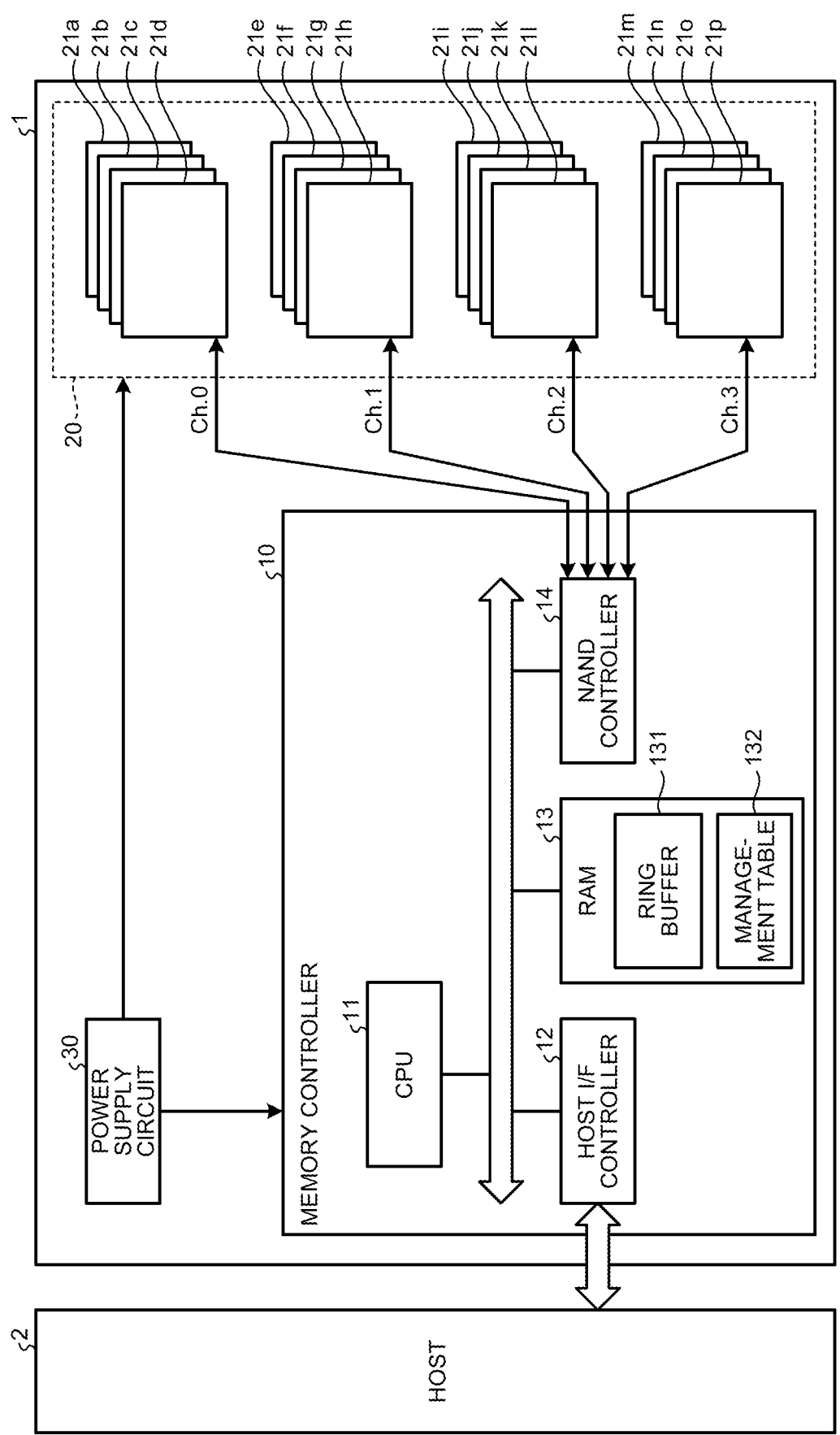
FIG. 1 is a diagram illustrating a configuration of a memory system according to an embodiment.

FIG. 1 is a diagram illustrating a configuration of a memory system 1 according to the embodiment. The memory system 1, which is, for example, a solid state drive (SSD), can be connected to a host 2. Standards of a communication path between the memory system 1 and the host 2 are not limited to specific standards. In one example, Peripheral Component Interconnect Express™ (PCIe™) or serial attached SCSI (SAS) can be adopted.

The host 2 is, for example, a personal computer, a portable information terminal, a server, or the like. The memory system 1 can receive an access command (in one example, a read command and a write command) from the host 2.

The memory system 1 includes a memory controller 10, a NAND flash memory (hereinafter, referred to as a NAND memory) 20 which is a nonvolatile memory, and a power supply circuit 30.

The NAND memory 20 includes one or more memory chips 21. Here, the NAND memory 20 includes 16 memory chips 21a to 21p.

Each of the 16 memory chips 21 (21a to 21p) constituting the NAND memory 20 is connected to the memory controller 10 via one of four channels (ch. 0 to ch. 3). According to the example in FIG. 1, the memory chips 21a to 21d are connected to the channel 0 (ch. 0). The memory chips 21e to 21h are connected to the channel 1 (ch. 1). The memory chips 21i to 21l are connected to the channel 2 (ch. 2). The memory chips 21m to 21p are connected to the channel 3 (ch. 3).

Each channel includes a wiring group including an I/O signal line and a control signal line. The I/O signal line is, for example, a signal line for transmitting and receiving data, an address, and a command. The control signal line is a signal line for transmitting and receiving, for example, a write enable (WE) signal, a read enable (RE) signal, a command latch enable (OLE) signal, an address latch enable (ALE) signal, a write protect (WP) signal, and the like.

The memory controller 10 can individually control the respective channels. The memory controller 10 can cause a total of four memory chips 21 connected to different channels to operate in parallel by simultaneously controlling the four channels.

Note that the number of channels provided in the memory system 1 is not limited to four. In addition, the number of memory chips 21 connected to each channel is not limited to four.

Each memory chip 21 constitutes a storage area of the NAND memory 20, and includes a memory cell array in which NAND circuits are arranged in a lattice pattern. The memory cell array stores data received from the host 2, data (such as a firmware program and management information) necessary for operation of the memory system 1, and the like.

The memory cell array is divided into a plurality of blocks. The block is unit of erasure. To write data in a desired block of the NAND memory 20, the memory controller 10 performs erasure for the desired block and then writes data to the block for which erasure is performed. The NAND memory 20 has a limitation in the number of erasable times for each block.

The power supply circuit 30 generates internal power supply for driving the memory controller 10 and the NAND memory 20. The power supply circuit 30 supplies the generated internal power to each of the memory controller 10 and the NAND memory 20.

The memory controller 10 is a circuit that executes control of the memory system 1. For example, the memory controller 10 executes data transfer between the host 2 and the NAND memory 20 using a random access memory (RAM) 13 which will be described later.

The memory controller 10 includes a central processing unit (CPU) 11, a host interface controller (host I/F controller) 12, a RAM 13, and a NAND controller 14. The memory controller 10 can be configured as, for example, a system-on-chip (SoC). The memory controller 10 may include a plurality of chips.

The NAND controller 14 is a circuit that executes access to the NAND memory 20.

The RAM 13 is a memory that functions as a cache, a buffer, and a working area. The RAM 13 can be constituted with, for example, a dynamic random access memory (DRAM), a static random access memory (SRAM), or combination thereof. The RAM 13 may be disposed outside the memory controller 10.

The RAM 13 is provided with a ring buffer 131. The RAM 13 is provided with a management table 132. The ring buffer 131 and the management table 132 are operated by the CPU 11.

Figure 2:
FIG. 2 is a diagram illustrating an example of a data configuration of a management table according to the embodiment.

Here, FIG. 2 is a diagram illustrating an example of a data configuration of the management table 132. As illustrated in FIG. 2, the management table 132 stores the vacant, the number of erasures, and erasing order for each block number indicating a block of the memory chip 21 of the NAND memory 20. The vacant is data indicating whether a block is used or vacant (that is, unused). The number of erasures is data indicating the number of times data of the block is erased. Data is written into the block after data is erased, and thus, the number of erasures corresponds to the number of writes. The erasing order, which represents a waiting time until the next erasure, is data that can specify order of erasure of data in the block.

Note that while in the present embodiment, the management table 132 stores the erasing order as the waiting time for each block, the present embodiment is not limited thereto. For example, instead of the erasing order, the erasing time which is time at which data in the block is erased, the elapsed time after data is erased from the block, or the like, may be stored as the waiting time for each block.

The data stored in the RAM 13 is written as management information to the NAND memory 20 before the internal power supply is cut off. The management information written in the NAND memory 20 is stored in a nonvolatile manner. Then, the management information stored in the NAND memory 20 is loaded into the RAM 13 after the internal power is supplied next.

The host interface controller 12 controls transmission and reception of information (command, data) between the host 2 and the memory controller 10.

The CPU 11 is a processor that operates on the basis of a program (firmware program) stored in advance in the memory system 1. The firmware program is stored in, for example, the NAND memory 20. The CPU 11 loads the firmware program from the NAND memory 20 to the RAM 13 upon start-up of the memory system 1. Then, the CPU 11 executes the firmware program loaded in the RAM 13. The CPU 11 implements various functions of the memory controller 10 according to the firmware program.

For example, the CPU 11 executes static wear leveling (SWL). The SWL is processing for preventing life of each block of the NAND memory 20 from being ununiformly shortened. In the SWL, the CPU 11 executes processing of leveling the number of erasures (the number of writes) for each block also for a block in which static data with a low rewrite frequency is written. More specifically, the SWL targets both a block to which static data is written and a block to which dynamic data with a high rewrite frequency is written, and levels the number of erasures for each block. Specifically, in the SWL, if the number of erasures of the block in which static data is written is small, the CPU 11 rewrites the static data to a block having a large number of erasures among vacant blocks (or free blocks). Through such SWL, a block for which the number of erasures is small becomes vacant (or free), and by utilizing the block as a block to which dynamic data is to be written, it is possible to level the number of erasures for each block.

By the way, to execute the SWL as described above, it is necessary to consider an access pattern for a block of the NAND memory 20. Here, an access pattern for a block of the NAND memory 20 will be described. The access pattern corresponds to a ratio between a static data amount and a dynamic data amount.

Figure 3:
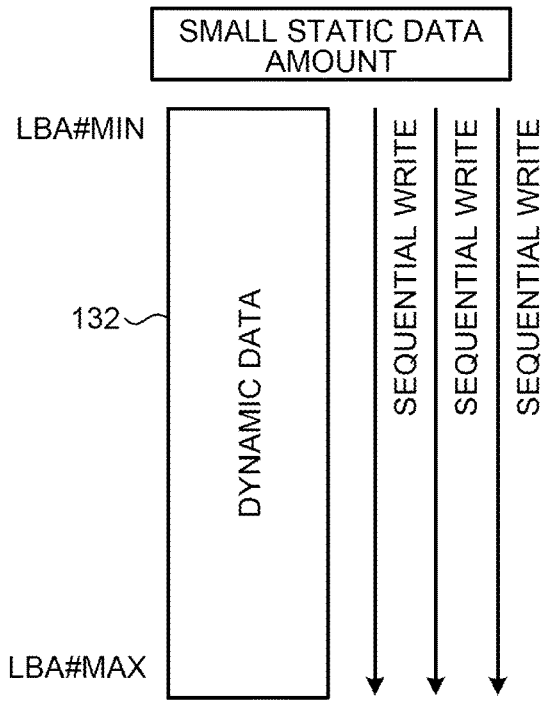
FIG. 3 is a diagram illustrating an example of an access pattern with a small static data amount according to the embodiment.

FIG. 3 is a diagram illustrating an example of an access pattern with a small static data amount (that is, almost none). The example illustrated in FIG. 3 assumes repetition of sequential write of data for a certain logical block address (LBA) range of the NAND memory 20 as an access pattern with a small static data amount. As a result of sequential write being repeated for a certain LBA range, data written in this LAB range is handled as dynamic data.

Figure 4:
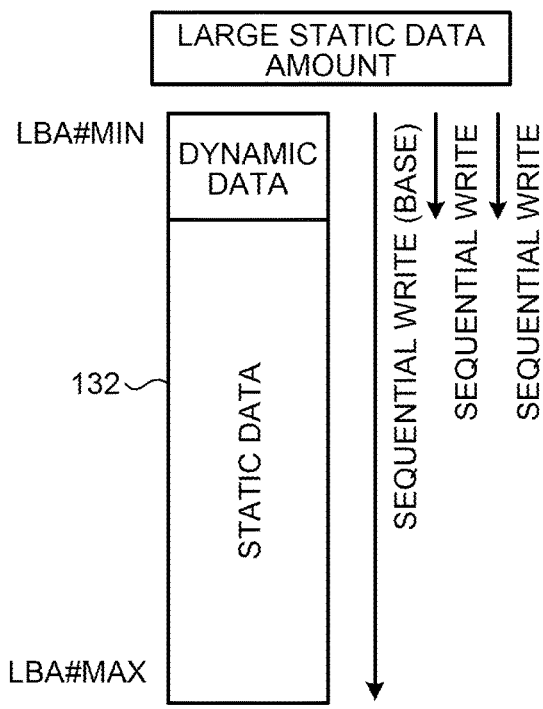
FIG. 4 is a diagram illustrating an example of an access pattern with a large static data amount according to the embodiment.

FIG. 4 is a diagram illustrating an example of an access pattern with a large static data amount. The example illustrated in FIG. 4 assumes that, as an access pattern with a large static data amount, first, sequential write of data for the entire LBA range of the NAND memory 20 is performed at least once as pre-conditioning (base), and then sequential write of data for a certain narrow LBA range of the NAND memory 20 is repeated. As a result of the sequential write being repeated, data in the certain narrow LBA range is handled as dynamic data. After the sequential write is performed at least once, data in an LBA range to which data is not written again is handled as static data.

Here, problems of the SWL in a comparative example with respect to the present embodiment will be described.

Figure 5:
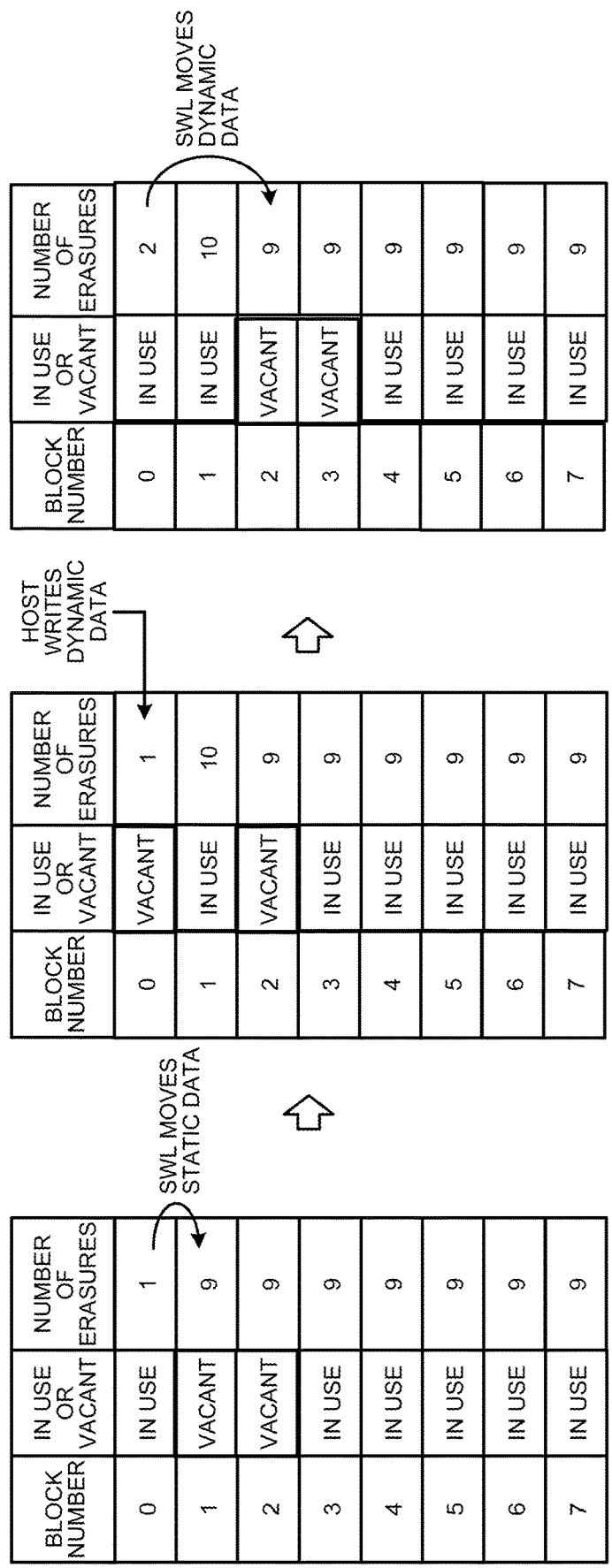
FIG. 5 is a diagram illustrating an execution example of SWL according to a first comparative example.

Here, FIG. 5 is a diagram illustrating an execution example of SWL according to a first comparative example. The first comparative example illustrated in FIG. 5 illustrates an example where determination as to whether or not it is necessary to activate SWL is performed only on the basis of the number of erasures for each block in the NAND memory. For example, in a case where rewriting speed of static data by SWL is slower than an increase speed of the number of erasures by write of dynamic data from the host, a difference in the number of erasures between a block which is a candidate for a rewriting source and a block which is a candidate for a rewriting destination may be larger than a certain condition. A case where SWL according to the first comparative example is executed in this state will be described. Here, the increase speed of the number of erasures indicates increase in the number of erasures in a certain time period, and the rewriting speed by SWL indicates the number of times of rewrite by SWL in the same certain time period. In the example illustrated in FIG. 5, the certain condition is that the difference in the number of erasures is 7.

The difference (9−1=8) in the number of erasures between a used block (block number 0) in which static data is written and a certain vacant block (block number 1) is larger than the certain condition (7). Thus, data is rewritten by the SWL from the rewriting source block (block number 0) to the rewriting destination block (block number 1). This SWL is appropriate processing because static data is rewritten. After completion of the rewrite, the rewriting source block (block number 0) becomes a vacant block. It is assumed here that a block (block number 0) for which rewrite is less performed among vacant blocks is used as a write target block and dynamic data from the host is written. Erasure is executed when the write target block (block number 0) is used, and thus, the number of erasures is incremented by 1 (1+1=2). After the write of the dynamic data to the rewrite target block (block number 0) is completed, in a case where the number of erasures for the vacant block (block number 2) is (9) which is the same as the number of erasures for the rewriting destination block (block number 1) before the rewrite by the executed SWL, the difference in the number of erasures (9−2=7) between the vacant block (block number 2) and the rewrite target block (block number 0) is the same as the certain condition (7). Thus, although the data written in the rewrite target block (block number 0) is dynamic data, the data is rewritten from the rewriting source block (block number 0) to the rewriting destination block (block number 2) by the SWL. However, the data written in the rewriting source block (block number 0) is dynamic data, and thus, this rewrite is useless.

Figures 6A, 6B:
FIG. 6A is a diagram illustrating a part of another execution example of SWL according to the first comparative example.
FIG. 6B is a diagram illustrating another part of another execution example of SWL according to the first comparative example.

FIGS. 6A to 6H are diagrams illustrating another execution example of the SWL according to the first comparative example. The first comparative example illustrated in FIGS. 6A to 6H illustrates an example where determination as to whether or not it is necessary to activate the SWL is performed on the basis of the number of erasures for each block in the NAND memory. In FIGS. 6A to 6H, in a case where a block is vacant, the vacant is indicated by x, and in a case where a block is not vacant, the vacant is indicated by o. As illustrated in FIG. 6A, it is assumed that static data is stored in block number 0 and dynamic data is stored in block number 2 to 7. In addition, it is assumed that block number 1 is vacant for some reason. Note that the numbers attached to the dynamic data in FIGS. 6A to 6H indicate the order in which the data is stored in the respective drawings.

In such a state, as illustrated in FIG. 6A, it is assumed that sequential write of dynamic data is repeated for a block other than a block (block number 0) in which static data is stored. Here, in a case where block number 0 reaches a certain condition (for example, there is a vacant block (block number 1), and a difference in the number of erasures from the vacant block is 7), the static data in block number 0 is rewritten to the vacant block (block number 1). Thereafter, as illustrated in FIG. 6B, block number 0 of the rewriting source becomes a vacant block. In addition, the static data is written to block number 1, block number 1 is no longer in a vacant state, and the number of erasures is incremented by 1 to become 9.

After that, as illustrated in FIG. 6C, it is assumed that sequential write of dynamic data is repeated (for example, repeated for eight times) for a block other than a block (block number 1) in which static data is stored. Here, in a case where block number 1 reaches a certain condition (for example, there is a vacant block (block number 2), and a difference in the number of erasures from the vacant block is 7), the static data in block number 1 is rewritten to the vacant block (block number 2). Thereafter, as illustrated in FIG. 6D, block number 1 of the rewriting source becomes a vacant block. In addition, the static data is written to block number 2, block number 2 is no longer in a vacant state, and the number of erasures is incremented by 1 to become 17.

Furthermore, as illustrated in FIG. 6E, after dynamic data is written to block number 1 that has become the vacant block, in a case where the difference in the number of erasures between block number 0 in which the dynamic data is stored and block number 3 reaches a certain condition (here, the difference in the number of erasures is 7), block number 0 in which the dynamic data is stored is set as a candidate for data to be moved. Then, as illustrated in FIG. 6E, after block number 3 is set as a vacant block, the dynamic data in block number 0 is rewritten to the vacant block (block number 3). Then, as illustrated in FIG. 6F, block number 0 of the rewriting source becomes a vacant block. In addition, the dynamic data is written to block number 3, block number 3 is no longer in a vacant state, and the number of erasures is incremented by 1 to become 17.

After that, as illustrated in FIG. 6G, it is assumed that sequential write of dynamic data is repeated (for example, repeated for seven or eight times) for a block other than a block (block number 2) in which static data is stored. Here, in a case where the static data in block number 2 reaches a certain condition (for example, there is a vacant block (block number 3), and a difference in the number of erasures from the vacant block is 7), the static data in block number 2 is rewritten to the vacant block (block number 3). As illustrated in FIG. 6H, block number 2 of the rewriting source becomes a vacant block. In addition, the static data is written to block number 3, block number 3 is no longer in a vacant state, and the number of erasures is incremented by 1 to become 25.

In other words, as the first comparative example, in the determination as to whether or not it is necessary to activate SWL only on the basis of the number of erasures for each block in the NAND memory, there is a problem that dynamic data is rewritten in an access pattern with a low static data ratio (ratio of the static data amount in the NAND memory) such as repetition of the sequential write. As described above, if dynamic data on which overwrite is expected to be performed in the near future is frequently rewritten by the SWL in a similar manner to the static data, the number of writes or erasure (write/erase cycles) that does not contribute to improvement of reliability is consumed, which unnecessarily shortens life of the SSD.

Here, FIGS. 7A and 7B are diagrams illustrating an execution example of SWL according to a second comparative example. The second comparative example illustrated in FIGS. 7A and 7B illustrates an example where determination as to whether or not it is necessary to activate SWL is performed in accordance with the number of erasures and the erasing order for each block in the NAND memory. In a case where the access pattern is repetition of sequential write of dynamic data for the entire LBA range of the NAND memory in the first comparative example, it is the dynamic data that is written to the rewrite target block (for example, block number 0), and thus rewrite by the second SWL is useless. On the other hand, as illustrated in FIG. 7A, in the second comparative example, the erasing order that is the order of erasing the data in the blocks is stored for each block, and activation of the SWL is suppressed in a case where the difference in the erasing order does not satisfy a certain amount (in FIG. 7A, for example, the erasing order difference is equal to or larger than 56) even in a case where the number of erasures is large.

However, in the second comparative example, it is assumed that sequential write is repeated for the entire LBA range of the NAND memory in the future. Thus, as illustrated in FIG. 7B, in the second comparative example, in an access pattern with a high static data ratio such as repetition of sequential write for a narrow LBA range of the NAND memory, the number of erasures of only some local blocks is increased until the difference in the erasing order reaches a certain amount (in FIG. 7B, for example, the erasing order difference is equal to or larger than 56). Thus, in the second comparative example, as illustrated in FIG. 7B, there is a problem that widening of the difference in the number of erasures between the block (for example, block numbers 0 and 4 to 7) in which the static data is stored and the block (for example, block numbers 1 to 3) in which the dynamic data is stored is accelerated, which hinders leveling of the number of erasures between the blocks.

Thus, the memory system 1 of the present embodiment suppresses activation of the SWL in an access pattern with a low static data ratio (low ratio of the static data amount in the NAND memory), and activates the SWL and actively rewrites data in an access pattern with a high static data ratio, thereby achieving leveling of the number of erasures between the blocks. Schematically, the memory system 1 estimates the static data ratio by introducing difference history of the erasing order of the blocks in the memory chip 21 of the NAND memory 20. The static data ratio indicates a ratio of the static data amount in the NAND memory 20 with respect to a total size of the plurality of blocks. As a result, the memory system 1 of the present embodiment suppresses activation of the SWL in a case of an access pattern with a low static data ratio, and activates the SWL in a case of an access pattern with a high static data ratio to accelerate leveling of the difference between the numbers of times of erasure.

The SWL processing to be executed by the memory system 1 of the present embodiment will be described in detail.

Figure 8:
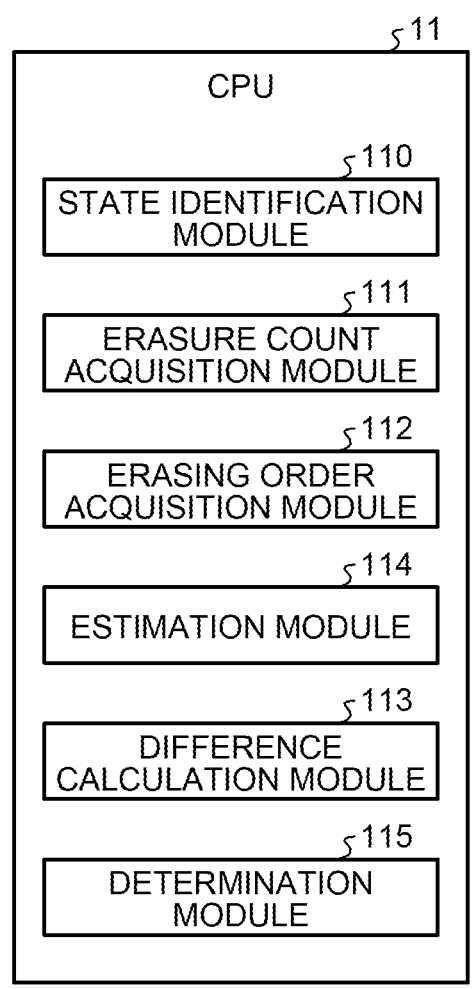
FIG. 8 is a functional block diagram illustrating functions related to the SWL processing according to the embodiment.

Here, FIG. 8 is a functional block diagram illustrating functions related to the SWL processing to be executed by the memory system 1 of the present embodiment. As illustrated in FIG. 8, the CPU 11 functions as a state identification module 110, an erasure count acquisition module 111, an erasing order acquisition module 112 as a waiting time acquisition module, a difference calculation module 113, an estimation module 114, and a determination module 115 according to the program.

The state identification module 110 identifies, for each block in the memory chip 21 of the NAND memory 20, whether the block is used or vacant. Then, the state identification module 110 stores the information as to the state identified for the block into the management table 132 of the RAM 13.

The erasure count acquisition module 111 counts the number of erasures, which is the number of times of erasing the data of the block, for each block in the memory chip 21 of the NAND memory 20. Then, the erasure count acquisition module 111 stores the counted number of erasures for each block into the management table 132 of the RAM 13. More specifically, to write data to a desired block of the NAND memory 20, the erasure count acquisition module 111 increments the number of erasures in response to erasure of the block.

The erasing order acquisition module 112 counts the order of erasure, which is the order of erasing the data of the block, for each block in the memory chip 21 of the NAND memory 20. Then, the erasing order acquisition module 112 stores the counted order of erasure for each block into the management table 132 of the RAM 13. More specifically, to write data to a desired block of the NAND memory 20, the erasing order acquisition module 112 calculates the next erasing order of the block in response to erasure of the block.

The difference calculation module 113 calculates a difference between a maximum value of the previous erasing order in the previous sequential write and a maximum value of the current erasing order in the current sequential write (the difference of the second waiting time) for a plurality of blocks which become write targets in a cycle of the current sequential write. Then, the difference calculation module 113 stores the calculated difference into the ring buffer 131 as difference history. Note that the difference calculation module 113 overwrites and stores new difference history at a position of the ring buffer 131 where the oldest difference history has been written.

Note that while in the present embodiment, the difference calculation module 113 stores the difference history into the ring buffer 131, the present embodiment is not limited thereto. For example, the difference calculation module 113 may store difference history into a general buffer.

The estimation module 114 estimates a ratio (static data ratio) of the static data amount in the memory chip 21 of the NAND memory 20 on the basis of a difference in the erasing order (difference in the first waiting time) before and after the rewrite to be executed next for the rewriting source block and a difference (difference in second waiting time) stored in the ring buffer 131. The estimation module 114 changes a SWL threshold which will be described later using an average value of the erasing order difference (difference of the second waiting time) history stored in the ring buffer 131 as a coefficient.

The determination module 115 determines whether or not it is necessary to activate the SWL on the basis of the difference between the number of erasures for the rewriting source block and the number of erasures for the rewriting destination block stored in the management table 132 and the static data ratio estimated by the estimation module 114. Furthermore, in a case where the SWL is activated, the determination module 115 determines a block for which the SWL is to be activated.

Next, processing of determining whether or not it is necessary to activate the SWL in the memory system 1 of the present embodiment will be described in detail.

First, an example of determining whether or not it is necessary to activate SWL for an access pattern with a low static data ratio will be described.

Figure 9:
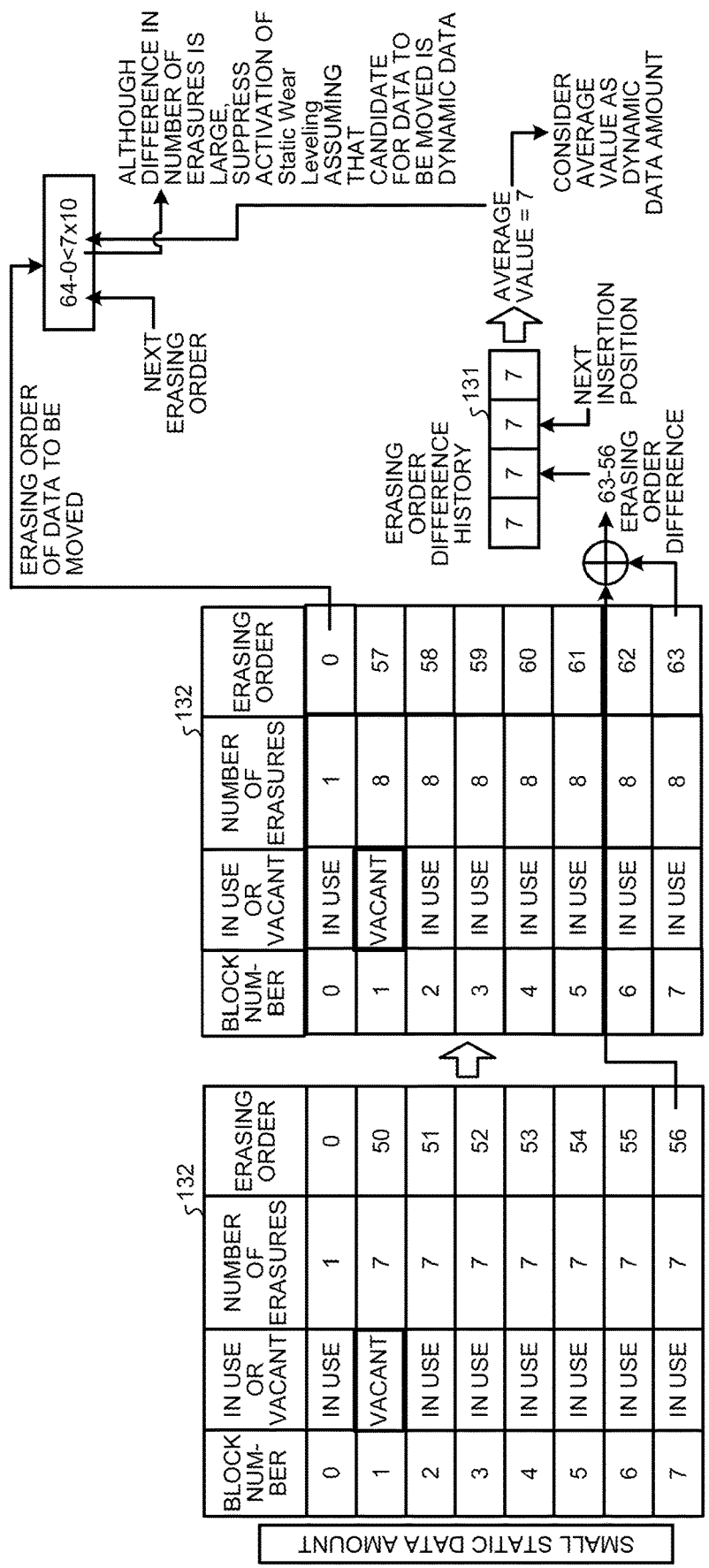
FIG. 9 is a diagram illustrating an example of determining whether or not it is necessary to activate SWL for an access pattern with a low static data ratio according to the embodiment.

FIG. 9 is a diagram illustrating an example of determining whether or not it is necessary to activate SWL for an access pattern with a low static data ratio. The example illustrated in FIG. 9 assumes repetition of sequential write of dynamic data for the entire LBA range of the NAND memory 20 as an access pattern with a low static data ratio. The block of the data rewriting source is a block (block number 0) having the minimum number of erasures in the used block group. In addition, the data in the rewriting destination block is set as one vacant block (block number 1) in the block group.

First, the determination module 115 determines whether a difference between the number of erasures for the rewriting destination block (block number 1) and the number of erasures for the rewriting source block (block number 0) is equal to or larger than a certain condition (for example, the difference in the number of erasures is 7). In the example illustrated in FIG. 9, the number of erasures for the rewriting destination block (block number 1) is 7, and the number of erasures for the rewriting source block (block number 0) is 1. Thus, the difference between the number of erasures for the rewriting destination block (block number 1) and the number of erasures for the rewriting source block (block number 0) is 6, and thus, the determination module 115 suppresses activation of the SWL.

The example illustrated in FIG. 9 illustrates states before and after the sequential write is executed one cycle. Note that in FIG. 9, the management table 132 illustrated on the left side indicates a state before the sequential write is executed one cycle, and the management table 132 illustrated on the right side indicates a state after the sequential write is executed one cycle. In the example illustrated in FIG. 9, after the sequential write is executed one cycle, the number of erasures for the rewriting destination block (block number 1) is 8, and the number of erasures for the rewriting source block (block number 0) is 1. Thus, the difference between the number of erasures for the rewriting destination block (block number 1) and the number of erasures for the rewriting source block (block number 0) is 7. The determination module 115 determines that the difference between the number of erasures for the rewriting destination block (block number 1) and the number of erasures for the rewriting source block (block number 0) is equal to or larger than a certain condition (for example, the difference in the number of erasures is 7). As a result of the determination, the determination module 115 determines to activate SWL from the rewriting source block (block number 0) to the rewriting destination block (block number 1).

Next, the estimation module 114 determines whether or not a difference (difference in first waiting time) between the next erasing order and the current erasing order of the rewriting source block (block number 0) is equal to or greater than a SWL threshold. Here, the SWL threshold is a value obtained by multiplying the average value of the erasing order difference history by 10.

First, the difference calculation module 113 calculates a difference between the second waiting time indicating the access range before and after rewriting of the rewriting destination block, that is, a difference between a maximum value of the previous erasing order in the access range of the previous sequential write and a maximum value of the current erasing order in the access range of the current sequential write. In the example illustrated in FIG. 9, attention is focused on, for example, block number 7 having maximum erasing order among a plurality of blocks which become write targets in the cycle of the sequential write of this time. In block number 7, a maximum value of the previous erasing order in the previous cycle of the sequential write managed by the management table 132 is 56, and a maximum value of the current erasing order after the current cycle of the sequential write managed by the management table 132 is executed is 63. The difference calculation module 113 stores 63-56=7 as difference history in the ring buffer 131. In the example illustrated in FIG. 9, the average value of the difference history stored in the ring buffer 131 is 7 for a plurality of blocks which become write targets in the cycle of the sequential write of this time.

Here, the average value of the difference history is an index related to an access range (range) of data for the NAND memory 20. In other words, a large average value of the difference history (close to the number of blocks in the memory chip 21 of the NAND memory 20) indicates that the access range is an access pattern for a wide LBA range of the NAND memory 20. A small average value of the difference history (far from the number of blocks in the memory chip 21 of the NAND memory 20) indicates that the access range is an access pattern for a narrow LBA range of the NAND memory 20.

In addition, X times of the average value of the difference history indicates the number of cycles X of the sequential write for the access range (range) of the NAND memory 20. In the present embodiment, in order to secure the life and reliability of the NAND memory 20, an example is illustrated where the number of cycles X=10 (cycles).

The estimation module 114 estimates a ratio (static data ratio) of the static data amount in the memory system 1 on the basis of a difference (difference in the first waiting time) in the erasing order before and after the rewrite to be executed next of the rewriting source block identified as being in use by the state identification module 110 and an average value' 7' of the erasing order difference (difference in the second waiting time) history stored in the ring buffer 131. In the example illustrated in FIG. 9, the next erasing order of the rewriting source block (block number 0) is 64, and the current erasing order of the rewriting source block (block number 0) is 0. Thus, 64−0<7×10, and thus, the estimation module 114 determines that the difference between the next erasing order of the rewriting source block (block number 0) and the current erasing order of the rewriting source block (block number 0) is not equal to or greater than 10 times (SWL threshold) of the average value of the difference history. In this case, the estimation module 114 assumes that the static data amount is small and the dynamic data amount is large, and estimates that the static data ratio is low.

Then, the determination module 115 determines whether or not it is necessary to activate the SWL on the basis of the difference between the number of erasures for the rewriting source block and the number of erasures for the rewriting destination block stored in the management table 132 and the static data ratio estimated by the estimation module 114. In the example illustrated in FIG. 9, the determination module 115 considers that the rewriting source candidate is dynamic data and suppresses activation of the SWL although the difference between the number of erasures for the rewriting source block and the number of erasures for the rewriting destination block is large.

Next, an example of determining whether or not it is necessary to activate SWL for an access pattern with a high static data ratio will be described.

Figure 10:
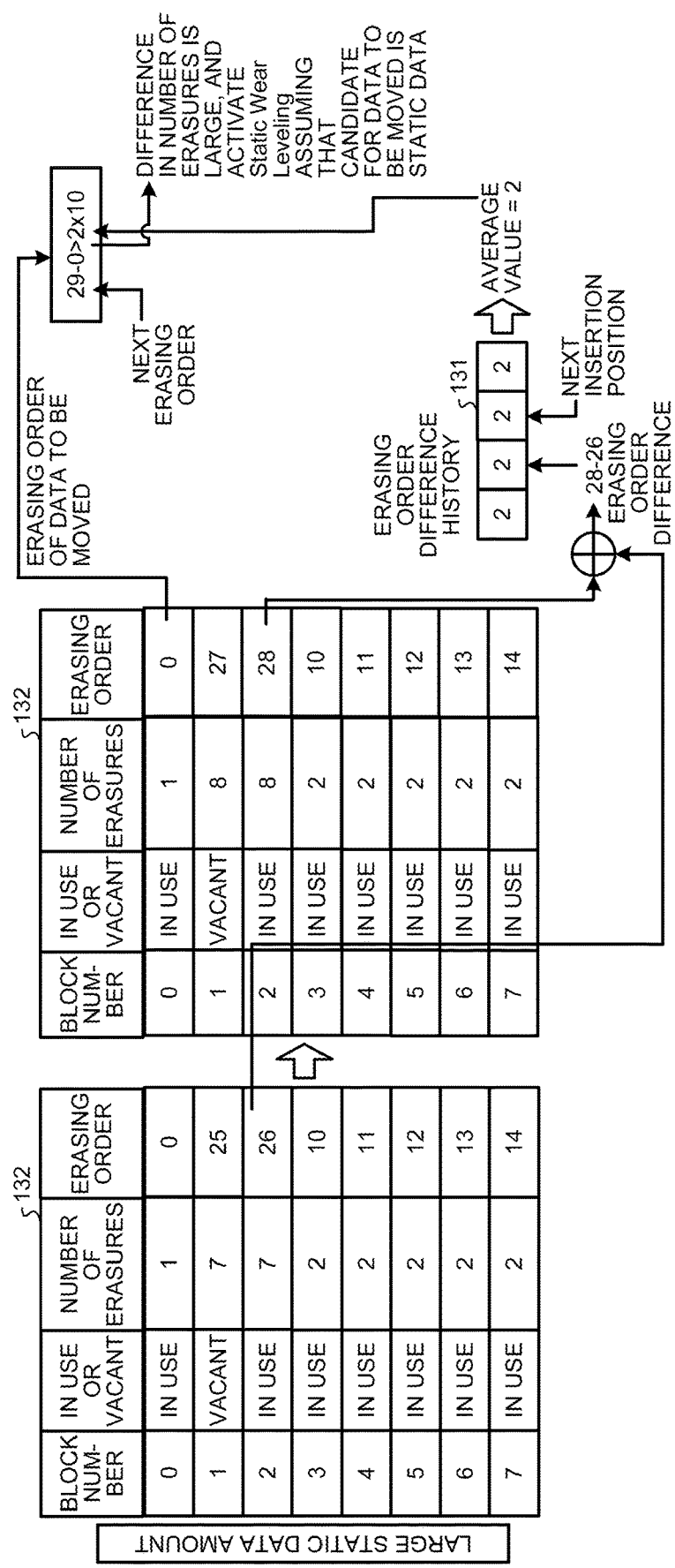
FIG. 10 is a diagram illustrating an example of determining whether or not it is necessary to activate SWL for an access pattern with a high static data ratio according to the embodiment.

FIG. 10 is a diagram illustrating an example of determining whether or not it is necessary to activate SWL for an access pattern with a high static data ratio. The example illustrated in FIG. 10 assumes repetition of sequential write of dynamic data for a narrow LBA range among the entire LBA range after executing one cycle of sequential write of static data for the entire LBA range of the NAND memory 20, as an access pattern with a high static data ratio. The block of the data rewriting source is a block (block number 0) having the minimum number of erasures in the used block group. In addition, the data in the rewriting destination block is set as one vacant block (block number 1) in the block group.

First, the determination module 115 determines whether a difference between the number of erasures for the rewriting destination block (block number 1) and the number of erasures for the rewriting source block (block number 0) is equal to or larger than a certain condition (for example, the difference in the number of erasures is 7). In the example illustrated in FIG. 10, the number of erasures for the rewriting destination block (block number 1) is 7, and the number of erasures for the rewriting source block (block number 0) is 1. Thus, the difference between the number of erasures for the rewriting destination block (block number 1) and the number of erasures for the rewriting source block (block number 0) is 6, and thus, the determination module 115 suppresses activation of the SWL.

The example illustrated in FIG. 10 illustrates states before and after the sequential write is executed one cycle. Note that in FIG. 10, the management table 132 illustrated on the left side indicates a state before the sequential write is executed one cycle, and the management table 132 illustrated on the right side in FIG. 10 indicates a state after the sequential write is executed one cycle. In the example illustrated in FIG. 10, after the sequential write is executed one cycle, the number of erasures for the rewriting destination block (block number 1) is 8, and the number of erasures for the rewriting source block (block number 0) is 1. Thus, the difference between the number of erasures for the rewriting destination block (block number 1) and the number of erasures for the rewriting source block (block number 0) is 7. The determination module 115 determines that the difference between the number of erasures for the rewriting destination block (block number 1) and the number of erasures for the rewriting source block (block number 0) is equal to or larger than a certain condition (for example, the difference in the number of erasures is 7). As a result of the determination, the determination module 115 determines to activate SWL from the rewriting source block (block number 0) to the rewriting destination block (block number 1).

Next, the estimation module 114 determines whether or not a difference between the next erasing order and the current erasing order of the rewriting source block (block number 0) is equal to or greater than a SWL threshold. Here again, the SWL threshold is a value obtained by multiplying the average value of the erasing order difference history by 10.

First, the difference calculation module 113 calculates a difference between a maximum value of the previous erasing order in the access range of the previous sequential write and a maximum value of the current erasing order in the access range of the current sequential write. In the example illustrated in FIG. 10, attention is focused on, for example, block number 2 having maximum erasing order among a plurality of blocks which become write targets in the cycle of the sequential write of this time. In block number 2, a maximum value of the previous erasing order in the previous cycle of the sequential write managed by the management table 132 is 26, and a maximum value of the current erasing order after the current cycle of the sequential write managed by the management table 132 is executed is 28. The difference calculation module 113 stores 28−26=2 as difference history into the ring buffer 131. In the example illustrated in FIG. 10, the average value of the difference history stored in the ring buffer 131 is 2 for a plurality of blocks which become write targets in the cycle of the sequential write of this time.

Note that while in the present embodiment, as illustrated in FIGS. 9 and 10, the ring buffer 131 sequentially stores the difference history into four buffer entries, the present embodiment is not limited thereto, and the difference history may be sequentially stored in five or more buffer entries. Specifically, the ring buffer 131 may sequentially store the difference history into a number of buffer entries corresponding to the number of blocks of the NAND memory 20. Note that the number of buffer entries may be variable.

The estimation module 114 estimates a ratio (static data ratio) of the static data amount in the memory system 1 on the basis of a difference (difference in the first waiting time) in the erasing order before and after the rewrite to be executed next of the rewriting source block identified as being in use by the state identification module 110 and an average value' 2' of the erasing order difference (difference in the second waiting time) history stored in the ring buffer 131. In the example illustrated in FIG. 10, the next erasing order of the rewriting source block (block number 0) is 29, and the current erasing order of the rewriting source block (block number 0) is 0. Thus, 29−0>2×10, and thus, the estimation module 114 determines that the difference between the next erasing order of the rewriting source block (block number 0) and the current erasing order of the rewriting source block (block number 0) is equal to or greater than 10 times (SWL threshold) of the average value of the difference history. In this case, the estimation module 114 assumes that the static data amount is large and the dynamic data amount is small, and estimates that the static data ratio is high.

Then, the determination module 115 determines whether or not it is necessary to activate the SWL on the basis of the difference between the number of erasures for the rewriting source block and the number of erasures for the rewriting destination block stored in the management table 132 and the static data ratio estimated by the estimation module 114. In the example illustrated in FIG. 10, the determination module 115 assumes that the difference in the number of erasures is large, the rewriting source candidate is static data, and activates the SWL.

FIG. 11 is a flowchart illustrating flow of processing of SWL.

As illustrated in FIG. 11, first, the state identification module 110 identifies, for each block in the memory chip 21 of the NAND memory 20, whether the block is used or vacant. Then, the state identification module 110 stores the information as to the state identified into the management table 132 of the RAM 13 (S1).

Next, the estimation module 114 estimates a static data ratio that is a ratio of the static data amount in the memory chip 21 of the NAND memory 20 on the basis of a difference in the first waiting time before and after rewrite of a predetermined rewriting source block identified as being in use by the state identification module 110 and a difference in the second waiting time corresponding to an access range before and after rewrite of a predetermined rewriting destination block identified as not in use by the state identification module 110 (S2).

Next, the determination module 115 determines whether or not it is necessary to activate static wear leveling (SWL) for leveling the number of erasures for each block, and determines a target block for which the SWL is to be activated, on the basis of a difference between the number of erasures for the rewriting source block and the number of erasures for the rewriting destination block and the static data ratio (S3).

As described above, according to the memory system 1 of the present embodiment, it is possible to optimize determination for each access pattern by determining whether or not to activate SWL and the block for which the SWL is to be activated including the static data ratio as well as the number of erasures for each block and the waiting time for each block.

According to the memory system 1 of the present embodiment, history of the difference value of the waiting time (for example, the erasing order) before and after rewrite of the rewriting destination block is stored, and the static data ratio that is the ratio of the static data amount in the NAND memory 20 is estimated from the history. Then, the memory system 1 determines whether or not to activate SWL and a target block from the estimated static data ratio.

As a result, it is possible to suppress rewrite of dynamic data in an access pattern with a high dynamic data ratio, such as repetition of sequential write of dynamic data for the entire LBA range of the NAND memory 20. In addition, in an access pattern with a low dynamic data ratio, such as repetition of sequential write of dynamic data for a narrow LBA range among the entire LBA range of the NAND memory 20, it is possible to achieve leveling of the number of erasures for each block by active rewrite.

In other words, according to the memory system 1 of the present embodiment, it is possible to avoid a problem that dynamic data is rewritten in an access pattern with a low static data ratio and a problem that leveling of a difference in the number of erasures for each block is hindered in an access pattern with a high static data ratio.

A program to be executed by the memory controller 10 of the memory system 1 of the present embodiment is provided by being incorporated in the NAND memory 20, or the like, in advance.

The program to be executed by the memory controller 10 of the memory system 1 according to the present embodiment may be provided by being recorded in a computer-readable recording medium such as a CD-ROM, a flexible disk (ED), a CD-R, or a digital versatile disc (DVD) as a file in an installable format or an executable format.

Furthermore, the program to be executed by the memory controller 10 of the memory system 1 of the present embodiment may be stored on a computer connected to a network such as the Internet and provided by being downloaded via the network. In addition, the program to be executed by the memory controller 10 of the memory system 1 of the present embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory including a plurality of blocks, each of the blocks being a unit of erasure; and
   a controller connected to the nonvolatile memory and connectable to a host, wherein
   the controller is configured to:
      manage, for each of the plurality of blocks, first information indicating whether a corresponding block is in use which indicates a state where the data is stored, second information indicating the number of erasures, and third information indicating a waiting time until next erasure;
      receive a request for first sequential write from the host;
      execute the first sequential write in the received request;
      receive a request for second sequential write from the host after the first sequential write; and
      determine whether to execute processing of leveling the number of erasures for each of the plurality of blocks with respect to a first block of which the first information indicates that data is in use, based on a first difference, a second difference, and a third difference when executing the second sequential write in the received request,
   the first difference is a difference in waiting time of the first block before and after data write which is to be executed next on the first block,
   the second difference corresponds to a difference between a first maximum value of erasing order in the first sequential write and a second maximum value of erasing order in the second sequential write, for a plurality of blocks which become write targets of the second sequential write, and the third difference is a difference between a number of erasures for the first block and a number of erasures for a second block of which the first information does not indicate that data is in use.

2. The memory system according to claim 1, wherein the controller is configured not to execute the processing of leveling the number of erasures when an access pattern of the second sequential write is an access pattern with a low static data ratio which is a ratio of a static data amount in the nonvolatile memory with respect to a total size of the plurality of blocks, and the controller is configured to execute processing of rewriting data stored in a rewriting source block to a rewriting destination block as the processing of leveling the number of erasures when an access pattern of the second sequential write is an access pattern with a high static data ratio with respect to the total size of the plurality of blocks.

3. The memory system according to claim 1, wherein the controller is configured to estimate a static data ratio that is a ratio of a static data amount in the nonvolatile memory in accordance with comparison between the first difference and a threshold based on a history of the second difference.

4. The memory system according to claim 1, further comprising:

a ring buffer configured to store a history of the second difference.

5. The memory system according to claim 1, wherein the waiting time for each block includes erasing order which is order in which the data is erased for each block.

6. The memory system according to claim 1, wherein the waiting time for each block includes an erasing time which is a time at which the data is erased for each block.

7. The memory system according to claim 1, wherein the waiting time for each block includes an elapsed time after the data is erased for each block.

8. A control method of a memory system including a nonvolatile memory including a plurality of blocks, each of the blocks being a unit of erasure, the control method comprising:

managing, for each of the plurality of blocks, first information indicating whether a corresponding block is in use which indicates a state where the data is stored, second information indicating the number of erasures, and third information indicating a waiting time until next erasure;

receiving a request for first sequential write from a host;
executing the first sequential write in the received request;
receiving a request for second sequential write from the host after the first sequential write; and determining whether to execute processing of leveling the number of erasures for each of the plurality of blocks with respect to a first block of which the first information indicates that data is in use, based on a first difference, a second difference, and a third difference when executing the second sequential write in the received request, wherein the first difference is a difference in waiting time of the first block before and after data write which is to be executed next on the first block, the second difference corresponds to a difference between a first maximum value of erasing order in the first sequential write and a second maximum value of erasing order in the second sequential write, for a plurality of blocks which become write targets of the second sequential write, and the third difference is a difference between a number of erasures for the first block and a number of erasures for a second block of which the first information does not indicate that data is in use.

9. The control method according to claim 8, further comprising:

preventing execution of the processing of leveling the number of erasures when an access pattern of the second sequential write is an access pattern with a low static data ratio that is a ratio of a static data amount in the nonvolatile memory with respect to a total size of the plurality of blocks; and executing processing of rewriting data stored in a rewriting source block to a rewriting destination block as the processing of leveling the number of erasures when an access pattern of the second sequential write is an access pattern with a high static data ratio with respect to the total size of the plurality of blocks.

10. The control method according to claim 8, further comprising:

estimating a static data ratio that is a ratio of a static data amount in the nonvolatile memory in accordance with comparison between the first difference and a threshold based on a history of the second difference.

11. The control method according to claim 8, wherein the memory system further includes a ring buffer configured to store a history of the second difference.

12. The control method according to claim 8, wherein the waiting time for each block includes erasing order which is order in which the data is erased for each block.

13. The control method according to claim 8, wherein the waiting time for each block includes an erasing time which is a time at which the data is erased for each block.

14. The control method according to claim 8, wherein the waiting time for each block includes an elapsed time after the data is erased for each block.

* * * * *